(12) United States Patent
Stalder et al.

(10) Patent No.: US 10,056,643 B2
(45) Date of Patent: Aug. 21, 2018

(54) BATTERY

(71) Applicant: The Swatch Group Research and Development Ltd, Marin (CH)

(72) Inventors: Michael Stalder, Bellmund (CH); Olga Reinauer, Neuchatel (CH); Fredy Zullig, Delemont (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/374,611

(22) Filed: Dec. 9, 2016

(65) Prior Publication Data

US 2017/0179517 A1 Jun. 22, 2017

(30) Foreign Application Priority Data

Dec. 21, 2015 (EP) .................................... 15201690

(51) Int. Cl.
*H01M 2/08* (2006.01)
*H01M 2/16* (2006.01)
(Continued)

(52) U.S. Cl.
CPC ......... *H01M 10/0486* (2013.01); *H01M 2/08* (2013.01); *H01M 2/1653* (2013.01);
(Continued)

(58) Field of Classification Search
CPC ...... H01M 2/0212; H01M 2/027; H01M 2/08; H01M 2/1653; H01M 2/361; H01M 4/661;
(Continued)

(56) References Cited

U.S. PATENT DOCUMENTS

| 5,102,753 A | 4/1992 | Rossoll et al. |
| 2004/0253512 A1 | 12/2004 | Watanabe et al. |

(Continued)

FOREIGN PATENT DOCUMENTS

| FR | 3 006 116 | 11/2014 |
| JP | 2002-280059 | 9/2002 |
| JP | 2015-220024 | 12/2015 |

OTHER PUBLICATIONS

European Search Report dated Jun. 28, 2016 in European application 15201690.3, filed on Dec. 21, 2015 (with English Translation of Categories of Cited Documents and Written Opinion).

(Continued)

*Primary Examiner* — Brittany Raymond
(74) *Attorney, Agent, or Firm* — Oblon, McClelland, Maier & Neustadt, L.L.P.

(57) ABSTRACT

The invention relates to a battery comprising at least a cathode current collector, a cathode, a separator, an electrolyte, an anode and an anode current collector, the cathode being disposed between the cathode current collector and the separator, and the anode being disposed between the separator and the anode current collector, the battery further comprising a sealing gasket disposed on the periphery of the cathode, of the anode and of the separator and connecting the inner peripheral edge of the cathode current collector to the inner peripheral edge of the anode current collector. Said sealing gasket is at least partly made of a viscoelastic elastomeric material.

18 Claims, 3 Drawing Sheets

(51) Int. Cl.
*H01M 10/04* (2006.01)
*H01M 10/0525* (2010.01)
*H01M 10/30* (2006.01)
*H01M 2/02* (2006.01)
*H01M 2/36* (2006.01)
*H01M 4/66* (2006.01)
*H01M 6/12* (2006.01)

(52) U.S. Cl.
CPC ....... *H01M 10/0525* (2013.01); *H01M 10/30* (2013.01); *H01M 2/027* (2013.01); *H01M 2/0212* (2013.01); *H01M 2/361* (2013.01); *H01M 4/661* (2013.01); *H01M 4/669* (2013.01); *H01M 6/12* (2013.01); *H01M 10/0436* (2013.01)

(58) Field of Classification Search
CPC .... H01M 4/669; H01M 6/12; H01M 10/0436; H01M 10/0486; H01M 10/0525; H01M 10/30
See application file for complete search history.

(56) References Cited

U.S. PATENT DOCUMENTS

| | | | |
|---|---|---|---|
| 2005/0178659 A1* | 8/2005 | Takahashi | C08G 61/124 204/291 |
| 2010/0181200 A1* | 7/2010 | Yang | B82Y 30/00 204/660 |
| 2011/0059355 A1* | 3/2011 | Zhang | H01M 4/8647 429/188 |
| 2011/0189528 A1 | 8/2011 | Wu et al. | |
| 2013/0133185 A1 | 5/2013 | Wu et al. | |
| 2014/0162116 A1 | 6/2014 | Stalder et al. | |
| 2016/0104913 A1 | 4/2016 | Moreau et al. | |

OTHER PUBLICATIONS

R.J. Arenz "Nonlinear Shear Behavior of Poly(vinyl acetate) Material", Mechanics of Time-Dependent Materials 2, Kluwer Academic Publishers, 1999, p. 19.

* cited by examiner

BATTERY

This application claims priority from European Patent Application No 15201690.3 of Dec. 21, 2015, the entire disclosure of which is hereby incorporated herein by reference.

FIELD OF THE INVENTION

The invention concerns a battery comprising at least a cathode current collector, a cathode, a separator, an electrolyte, an anode and an anode current collector, the cathode being disposed between the cathode current collector and the separator, and the anode being disposed between the separator and the anode current collector, the battery further comprising a sealing gasket disposed on the periphery of the cathode, of the anode and of the separator and connecting the inner peripheral edge of the cathode current collector to the inner peripheral edge of the anode current collector.

BACKGROUND OF THE INVENTION

Such batteries are, for example, disclosed in Patent EP 1202372. They preferably take the form of a thin film. In order to use these batteries in environments imparting significant mechanical stresses, for example watch bracelets, textiles, etc., it is necessary to develop very flexible batteries. Batteries available on the market are not sufficiently flexible, so that utilisation thereof in environments imparting significant mechanical stresses quickly leads to breakage of one of the battery elements. Indeed, cracks appear in the encapsulation material, for example, after being bent several times, leading to deterioration of the battery. Batteries have also been developed in which the current collectors, generally found at the ends of the battery, are used for encapsulation. It is consequently the element that undergoes the highest curvature stress, i.e. tensile stress at the highest (external) radius of curvature, and compressive stress at the smallest internal radius of curvature. Consequently, cracks appear in the current collectors after bending around a hundred times at radii of curvature of less than approximately 1.5 cm. These cracks become more marked with increasing bending and form folds which damage the active layers inside the battery. This results in a decrease in capacitance which becomes increasingly marked and eventually destroys the battery.

Further, in addition to flexibility, a battery must also have excellent gas barrier properties. Indeed, the electroactive materials of lithium-ion batteries, for example, are very sensitive to moisture.

SUMMARY OF THE INVENTION

It is an object of the invention to overcome the various drawbacks of known batteries that exhibit insufficient flexibility.

More specifically, it is an object of the invention to provide a battery permitting use in environments imparting significant mechanical stresses.

It is another object of the invention to provide a battery providing a compromise between its flexibility and its gas barrier properties.

To this end, the present invention concerns a battery comprising at least a cathode current collector, a cathode, a separator, an electrolyte, an anode and an anode current collector, the cathode being disposed between the cathode current collector and the separator, and the anode being disposed between the separator and the anode current collector, the battery further comprising a sealing gasket disposed on the periphery of the cathode, of the anode and of the separator and connecting the inner peripheral edge of the cathode current collector to the inner peripheral edge of the anode current collector.

According to the invention, said sealing gasket is at least partly made of a viscoelastic elastomeric material. Preferably, such a viscoelastic elastomeric material has a Young's modulus comprised between 500 Pa and 100 kPa and a shear modulus comprised between 250 Pa and 100 kPa.

Preferably, the electrolyte may take the form of a salt in aqueous solution, so that the operation of the battery is based on aqueous chemistry.

A battery according to the invention exhibits very high flexibility, higher than the flexibility of commercial batteries, yet is insensitive to gases, and especially to air moisture.

BRIEF DESCRIPTION OF THE DRAWINGS

Other characteristics and advantages of the invention will appear more clearly upon reading the following description of an embodiment of the invention, given simply by way of illustrative and non-limiting example, and the annexed Figures, among which.

DETAILED DESCRIPTION OF A PREFERRED EMBODIMENT

Figure 1:
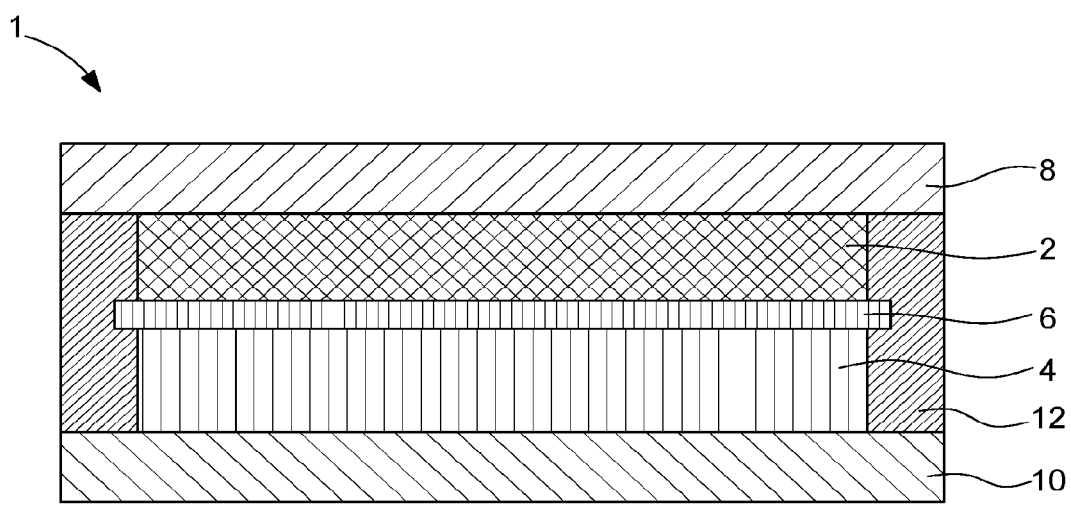
FIG. 1 is a cross-sectional view of a battery according to the invention.

Referring to FIG. 1, there is shown a battery 1 according to the invention. The battery may rechargeable or non-rechargeable. The term "battery" used in the present description means a battery, as well as a cell or an accumulator.

Battery 1 comprises a cathode 2 and an anode 4 separated from each other by a separator 6. Battery 1 further comprises two current collectors, namely a cathode current collector 8 and an anode current collector 10. Cathode 2 is disposed between cathode current collector 8 and separator 6, and anode 4 is disposed between separator 6 and anode current collector 10.

Separator 6 is generally made of polymers or composite materials.

Cathode and anode current collectors 8 and 10 may be made of stainless steel, for example, or of an at least partially amorphous metal material, when extreme flexibility is required. Such amorphous metal current collectors are described, for example, in Patent EP 2795702.

Battery 1 further comprises an electrolyte for the exchange of ions between cathode 2 and anode 4.

Further, the battery comprises a non-electroconductive sealing gasket 12, disposed on the periphery of cathode 2, of anode 4 and of separator 6 to form a frame around these elements. Sealing gasket 12 is disposed between cathode current collector 8 and anode current collector 10 to connect the inner peripheral edge of cathode current collector 8 to the inner peripheral edge of anode current collector 10. Thus, sealing gasket 12 and current collectors 8 and 10 form the encapsulation device for battery 1.

The thickness of sealing gasket 12 is equivalent to the thickness of the cathode, of the separator and of the anode. Typically, battery 1 has a total thickness of approximately 0.4 mm, current collectors 8 and 10 having a thickness that may vary from 1 µm to 50 µm. Preferably, the thickness will be comprised between 5 µm and 30 µm.

According to the invention, sealing gasket 12 is at least partly made of a viscoelastic elastomeric material. Advantageously, such a viscoelastic elastomeric material is not vulcanized or crosslinked by another method having comparable effects. In particular, it has not been subjected to vulcanization with sulphur. Preferably, such a viscoelastic elastomeric material has a Young's modulus comprised between 500 Pa and 100 kPa and a shear modulus comprised between 250 Pa and 100 kPa. Preferably the entire sealing gasket is made of this viscoelastic elastomeric material.

Due to the viscoelasticity of the material utilised in the invention, these values are measured for the Young's modulus and the shear modulus at the start of stress, at 0-2% and 0-1% respectively, and in traction at 10 mm/min and 2 mm/min respectively.

Preferably, the viscoelastic elastomeric material utilised in the invention exhibits a tensile strength of more than 50 N/cm$^2$ (ASTM D-897, after 72 h, 50 mm/min, 6.45 cm$^2$, 25° C.) and a dynamic shear resistance of more than 50 N/cm$^2$ (ASTM D-1002, after 72 h, 12.7 mm/min, 6.45 cm$^2$, 25° C.).

The Young's modulus and shear modulus values will be adapted to the desired application. In particular, low values will be chosen from the recommended ranges for applications requiring very great flexibility, such as watch bracelets. In such case, the elastomeric material may have a Young's modulus comprised between 500 Pa and 3 kPa and a shear modulus comprised between 250 Pa and 3 kPa. High values from the recommended ranges can be utilised in applications requiring lower flexibility, such as credit cards.

In a particularly advantageous manner, the elastomeric material utilised in the invention may be a foam having a density comprised between 500 and 900 kg/m$^3$, and preferably between 600 and 800 kg/m$^3$.

The sealing gasket may be assembled to the peripheral edges of cathode current collector 8 and anode current collector 10 by adhesive bonding, for example, the adhesive being adapted so as not to impair the flexibility provided by the elastomeric material.

In a particularly advantageous manner, the elastomeric material utilised in the invention is a pressure-sensitive or self-adhesive adhesive. This allows for simple, secure and fast encapsulation of the battery. Such a material is also self-healing.

Preferably, the viscoelastic elastomeric material utilised in the invention is chosen from the group comprising acrylics, natural rubbers, butyl rubbers, silicone rubbers, ethylene vinyl acetates (EVA), nitriles, styrenic block copolymers (SBC) (such as styrene-butadiene-styrene (SBS), styrene-ethylene/butylene-styrene (SEBS), styrene-ethylene/propylene (SEP), and styrene-isoprene-styrene (SIS)), and vinyl ethers.

Preferably, the viscoelastic elastomeric material utilised in the invention is a pressure-sensitive adhesive acrylic foam.

Further, the viscoelastic elastomeric material utilised in the invention is chosen such that the force of adhesion between said viscoelastic elastomeric material and the cathode and anode current collectors is greater than the forces of cohesion of said viscoelastic elastomeric material.

It is also possible to improve the adhesion of the viscoelastic elastomeric material at the inner peripheral edges of cathode and anode current collectors 8 and 10 by activating the inner surface of one or other of the current collectors. Known techniques of degreasing, abrasion to make the surface rough, plasma/corona treatments, depositions of adhesive primers, may be employed.

The viscoelastic elastomeric material is ideally applied by a roll to roll method, which permits precise alignment of the various elements, easy removal of the protective films and finally application of the pressure necessary for adhesion of the layers.

The viscoelastic elastomeric material utilised in the invention can absorb tensile and compressive stresses, so that the two cathode and anode current collectors can shear. Further, the shear stress is transformed into normal tensile/compressive stress leading to warping of the gasket, which practically eliminates the dependence of this stress on the battery length. This means it is possible to achieve batteries that are much longer than the radius of curvature.

Thus, the battery according to the invention can withstand, at least 5,000 times, bending with a radius of curvature of 1 cm by using two totally amorphous metal current collectors having a thickness of 25 micrometers in a battery with a total thickness of 0.4 mm, without damaging the latter. Among the thin film batteries currently available on the market, none can survive bending 150 times with a radius of curvature of 1 cm.

The elements of the battery of the invention can be chosen to operate with an electrolyte in non-aqueous solvent or a solid electrolyte. This type of chemistry is conventionally used in batteries and is known to those skilled in the art.

However, in a particularly preferred and advantageous manner, the electrolyte used in the battery according to the invention takes the form of a salt in aqueous solution, so that the operation of the battery is based on aqueous chemistry.

In such case, the anode and the cathode advantageously comprise an electroactive material whose potential difference is within the window of water stability. Thus, there will be no oxidation or reduction of water to form oxygen or hydrogen, which would lead to rapid deterioration of the battery. The voltage between the anode and the cathode is thus typically around 1.5 V.

For example, the battery elements are such that the battery is of the Ni-MH type with an aqueous electrolyte, or the lithium-ion type in an aqueous medium, for example $(-)$LISICON/LiNO$_3$/LiMn$_2$O$_4(+)$.

The electrolyte may also contain additives which increase its electrochemical stability.

Advantageously, the electrolyte can be injected through the elastomeric gasket to wet all the battery elements. As the material is self-healing, the gasket closes again after injection.

Advantageously, the electrolyte salt concentration is chosen such that the saturated vapour pressure of the electrolyte is equal to the mean air vapour pressure (relative humidity) in which the battery is situated, to within ±20%, preferably ±10%, in normal conditions of use. Thus, if the ambient air becomes drier than normal conditions of use, water evaporates from the battery, which has the effect of concentrating the electrolyte and shifting the equilibrium relative humidity to a lower value. If the ambient air becomes more humid than normal conditions of use, the battery absorbs water, which has the effect of diluting the electrolyte and increasing the equilibrium relative humidity. These changes are reversible, which ensures a long battery life.

Thus, unlike a non-aqueous battery in which any water absorption is harmful, the aqueous battery according to the invention can be optimised by selecting the salt concentration to adapt to different ambient air conditions. In addition to obtaining very high flexibility, the elastomeric sealing gasket used in the invention can also absorb the change in volume of the battery, and thereby ensure the proper operation thereof, independently of moisture conditions.

The battery according to the invention can be used for various applications such as, for example, a horological application or an application in a smart card or in telecommunications.

The following example illustrates the present invention without thereby limiting its scope.

The active materials are synthesised in accordance with the following publications:
Anode $LiTi_2(PO_4)_3$: C. Wessells et al., J. Electrochem. Soc., Vol. 158 (3), p. A352 (2011)
Cathode $LiMn_2O_4$: W. Liu et al., J. Electrochem. Soc., Vol. 143 (3), p. 879 (1996), but replacing 7.5 mol % of manganese (II) nitrate with chromium (III) nitrate.

Preparation of the Electrodes:

Anode: a composite is formed by grinding $LiTi_2(PO_4)_3$ with carbon black (Super P) with proportion 1:1 in a planetary ball mill at 300 rpm for 3 hours (20 mm diameter agate balls). Next, grinding is performed in an agate mortar with 8% PVDF (Kynar) and 4% graphite (Timrex MX15), then NMP is added and grinding continues until the PVDF has dissolved and a homogeneous dispersion is obtained (approx. 50% solid).

Cathode: $LiCr_{0.15}Mn_{1.85}O_4$ is ground in an agate mortar with 8% PVDF (Kynar) and 4% graphite (Timrex MX15), then NMP is added and grinding continues until the PVDF has dissolved and a homogeneous dispersion is obtained (approx. 50% solid).

The anode and cathode current collectors are 316L stainless steel sheets, 0.028 mm thick, degreased with isopropanol and abraded to roughen the surface and improve adhesion. They are then masked with masking tape (e.g. Nitto PS-2) at the place intended for the sealing gasket (e.g. a 5-mm border around the electrode), then coated with the preceding dispersions using a bar and spacers having the desired thickness, e.g. 0.2 mm.

The electrodes are dried at ambient temperature for 12 hours, then laminated at a pressure of 100 N/mm.

Assembly of the Cells:

A strip of VHB™ adhesive viscoelastic elastomeric tape sold by 3M™, provided with a central layer of closed-cell acrylic foam, exhibiting a Young's modulus of around 2500 Pa and a shear modulus of around 300 Pa, measured as indicated above, and having a thickness of 0.4 mm, is cut to the desired dimensions of the gasket (e.g. a rectangular frame with external dimensions of 50 mm×25 mm and internal dimensions of 40 mm×15 mm).

This frame is adhesive bonded on the cathode current collector at the place that was masked.

A glass microfibre separator (Whatman GF/D) is soaked with electrolyte: an aqueous solution of $Li_2SO_4$ 2M also containing 1% vinylene carbonate.

The anode is positioned on top, again so that the sealing gasket/frame adheres to the steel collector at the place which was masked A pressure of 20 $N/cm^2$ is applied so that the sealing gasket adheres well to the steel.

After one day of storage, the volume of electrolyte is made up to 15 microliter/$cm^2$ by injecting it through the sealing gasket via a syringe having a needle with an external diameter of approximately 0.2 mm (e.g. Hamilton HA-7750-22).

Figure 2:
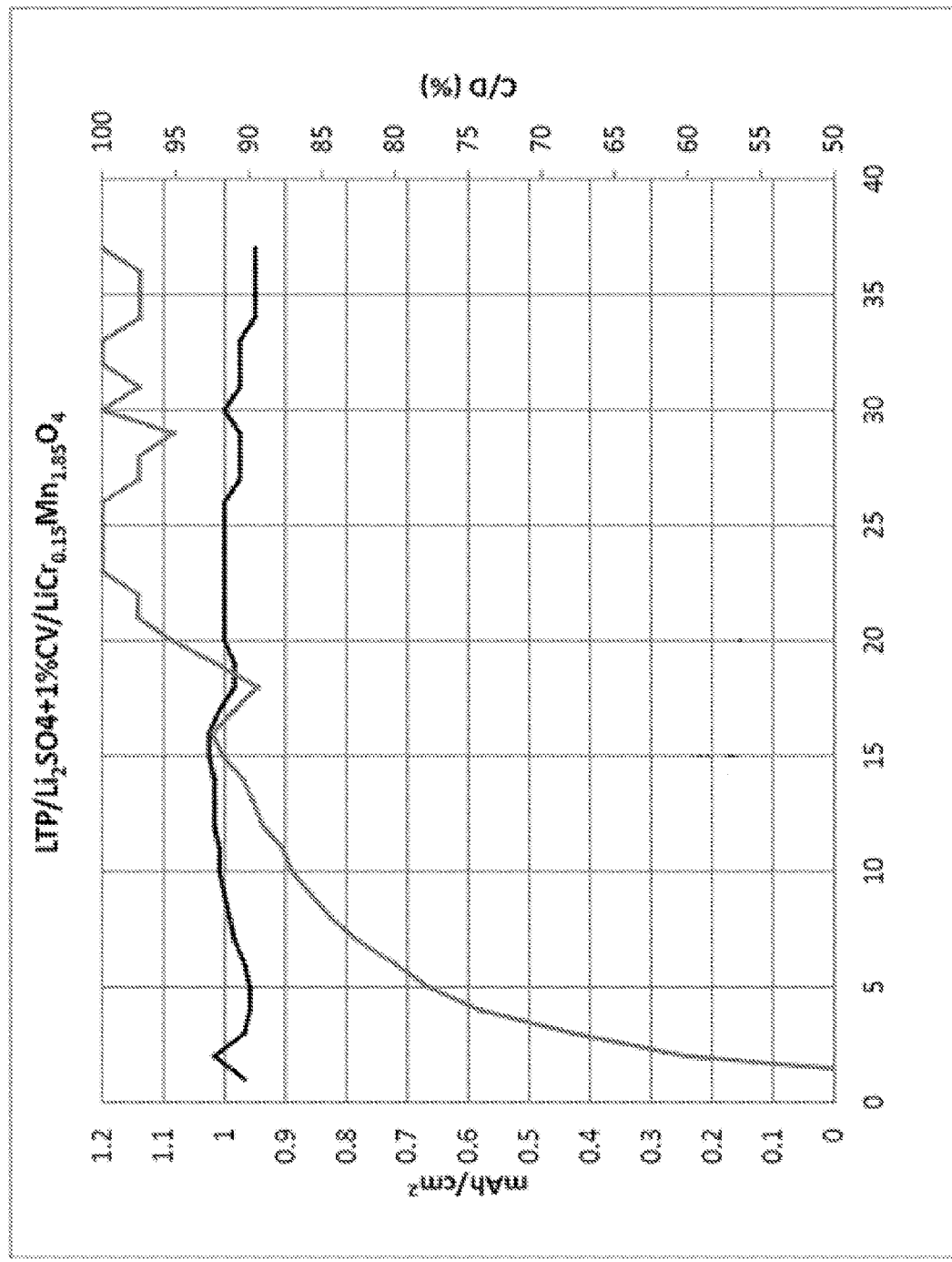
FIG. 2 represents the battery capacity obtained as a function of the number of cycles up to 40 cycles.

FIG. 2 represents the battery capacities obtained as a function of the number of cycles, with a discharge rate of 1 mA for cycles 1 to 19, and then of 3 mA after cycle 20.

Figure 3:
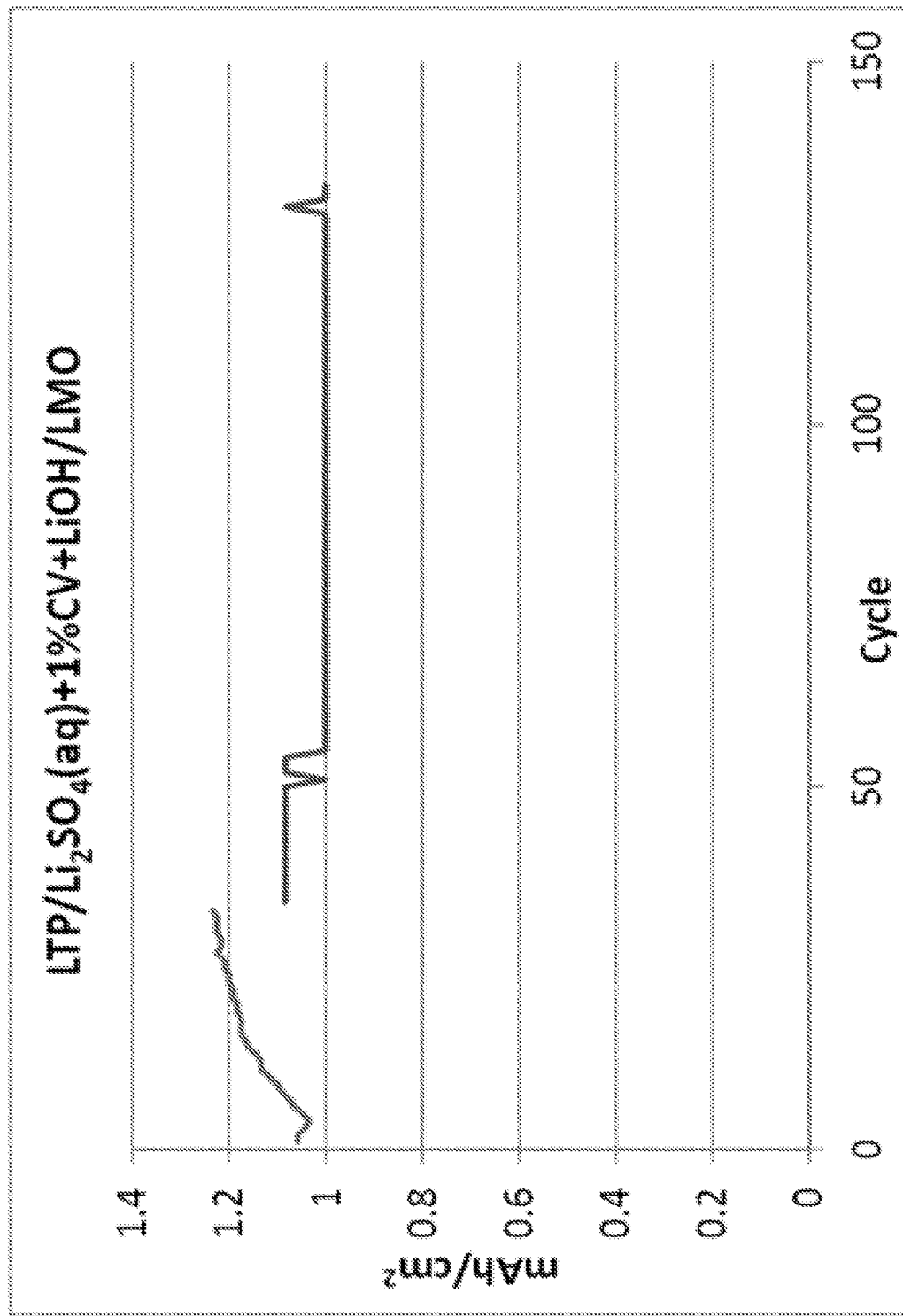
FIG. 3 represents the battery capacity obtained as a function of the number of cycles up to 140 cycles.

FIG. 3 represents 40 discharges at C/2 (first part of the curve on the left) followed by 100 discharges at 5 C (second part of the curve to the right), demonstrating the excellent stability of the obtained battery after 100 cycles.

Bending Test:

The battery obtained according to the invention is sandwiched between two PET films. One end of each film is fixed on a cylinder, whose diameter corresponds to 2 times the desired radius of curvature. The other end is fixed to a 500 g counterweight, sufficiently heavy to bend the battery, i.e. to press it against the cylinder.

The battery is then rolled a certain number of times around the cylinder. By changing the direction of rotation after each bend, convex bending can be alternated with concave bending.

The battery according to the invention can be bent alternately 5000 times with a frequency of 0.1 Hz, with a radius of curvature of 1 cm without damage.

What is claimed is:

1. A battery comprising at least a cathode current collector, a cathode, a separator, an electrolyte, an anode and an anode current collector, the cathode being disposed between the cathode current collector and the separator, and the anode being disposed between the separator and the anode current collector, the battery further comprising a sealing gasket disposed on the periphery of the cathode, of the anode and of the separator and connecting the inner peripheral edge of the cathode current collector to the inner peripheral edge of the anode current collector, wherein said sealing gasket is at least partially made of a viscoelastic elastomeric material, the cathode and anode current collectors are metal, and the force of adhesion between the viscoelastic elastomeric material and the cathode and anode current collectors is greater than the cohesive forces of the viscoelastic elastomeric material.

2. The battery according to claim 1, wherein the viscoelastic elastomeric material has a Young's modulus between 500 Pa and 100 kPa and a shear modulus between 250 Pa and 100 kPa.

3. The battery according to claim 2, wherein the viscoelastic elastomeric material has a Young's modulus between 500 Pa and 3 kPa and a shear modulus between 250 Pa and 3 kPa.

4. The battery according to claim 1, wherein the viscoelastic elastomeric material is a foam having a density between 500 and 900 $kg/m^3$.

5. The battery according to claim 4, wherein the viscoelastic elastomeric material is a foam having a density between 600 and 800 $kg/m^3$.

6. The battery according to claim 1, wherein the viscoelastic elastomeric material is a pressure-sensitive adhesive.

7. The battery according to claim 1, wherein the viscoelastic elastomeric material is selected from the group consisting of acrylics, natural rubbers, butyl rubbers, silicone rubbers, ethylene vinyl acetates (EVA), nitriles, styrenic block copolymers (SBC) and vinyl ethers.

8. The battery according to claim 1, wherein the cathode and anode current collectors are made of at least partially amorphous metal material.

9. The battery according to claim 1, wherein the electrolyte is a salt in aqueous solution.

10. The battery according to claim 9, wherein the electrolyte salt concentration in the aqueous solution is chosen such that the saturated vapour pressure of the electrolyte is equal to the mean air vapour pressure in which the battery is situated, to within ±20%.

11. The battery according to claim 10, wherein the electrolyte salt concentration in the aqueous solution is chosen such that the saturated vapour pressure of the electrolyte is equal to the mean air vapour pressure in which the battery is situated, to within ±10%.

12. The battery according to claim 9, wherein the cathode and the anode advantageously comprise an electroactive material whose potential difference is within the window of water stability.

13. The battery according to claim 1, wherein the inner peripheral edges of the cathode and the anode current collectors are degreased, abraded. plasma/corona treated, and/or primed to improve adhesion of the cathode and the anode current collectors to the sealing gasket.

14. The battery according to claim 1, wherein the cathode and anode current collectors each have a thickness from 1 to 50 μm.

15. The battery according to claim 1, wherein the cathode and anode current collectors are stainless steel sheets.

16. The battery according to claim 1, wherein the cathode and anode current collectors are made of totally amorphous metal.

17. The battery according to claim 1, wherein the sealing gasket is a closed-cell acrylic foam.

18. The battery according to claim 1, wherein the sealing gasket is a pressure-sensitive adhesive acrylic foam.

* * * * *

UNITED STATES PATENT AND TRADEMARK OFFICE
CERTIFICATE OF CORRECTION

| | |
|---|---|
| PATENT NO. | : 10,056,643 B2 |
| APPLICATION NO. | : 15/374611 |
| DATED | : August 21, 2018 |
| INVENTOR(S) | : Michael Stalder et al. |

It is certified that error appears in the above-identified patent and that said Letters Patent is hereby corrected as shown below:

In the Specification

Column 3, Line 49, delete "acrylics,natural" and insert -- acrylics, natural --.

Column 5, Line 57, after "masked" insert -- . --.

In the Claims

Column 7, Line 12, Claim 13, delete "abraded." and insert -- abraded, --.

Signed and Sealed this
Twenty-eighth Day of April, 2020

Andrei Iancu
*Director of the United States Patent and Trademark Office*